US012492688B2

(12) United States Patent
Ruan et al.

(10) Patent No.: US 12,492,688 B2
(45) Date of Patent: Dec. 9, 2025

(54) PRESSING PUMP

(71) Applicant: Zhejiang Jinsheng New Materials Co., Ltd., Shaoxing (CN)

(72) Inventors: Rongtao Ruan, Shaoxing (CN); Qijiang Ruan, Shaoxing (CN); Yifeng Cai, Shaoxing (CN); Zongyuan Du, Shaoxing (CN); Hongkai Wang, Shaoxing (CN)

(73) Assignee: Zhejiang Jinsheng New Materials Co., Ltd., Shaoxing (CN)

( * ) Notice: Subject to any disclaimer, the term of this patent is extended or adjusted under 35 U.S.C. 154(b) by 0 days.

(21) Appl. No.: 18/407,464

(22) Filed: Jan. 9, 2024

(65) Prior Publication Data

US 2024/0410346 A1 Dec. 12, 2024

(30) Foreign Application Priority Data

Jun. 8, 2023 (CN) ......................... 202310675428.5

(51) Int. Cl.
*F04B 9/14* (2006.01)
*B05B 11/10* (2023.01)

(52) U.S. Cl.
CPC ............ *F04B 9/14* (2013.01); *B05B 11/1001* (2023.01); *B05B 11/1023* (2023.01)

(58) Field of Classification Search
CPC ..... B05B 11/1023; B05B 11/1001; F04B 9/14
See application file for complete search history.

(56) References Cited

U.S. PATENT DOCUMENTS

2008/0035678 A1* 2/2008 Lee ..................... B05B 11/1023 222/320
2012/0267399 A1 10/2012 Moretti et al.
2024/0268608 A1* 8/2024 De Man .............. B05B 11/1077

FOREIGN PATENT DOCUMENTS

| | | | |
|---|---|---|---|
| CN | 105035506 | B | 6/2017 |
| CN | 210455794 | U | 5/2020 |
| CN | 112678332 | A | 4/2021 |
| CN | 213949300 | U | 8/2021 |
| CN | 113665972 | A | 11/2021 |
| CN | 214609080 | U | 11/2021 |
| CN | 220130805 | U | 12/2023 |
| JP | 2004041899 | A | 2/2004 |

(Continued)

OTHER PUBLICATIONS

Gao Lu, et al., Analysis of Semi-fluid Packaging and Hygiene Safety, Shanghai Packaging, 2016, pp. 36-38.

*Primary Examiner* — Thomas Fink
(74) *Attorney, Agent, or Firm* — Bayramoglu Law Offices

(57) ABSTRACT

A pressing pump includes a pump case, a piston, a pump rod, and a pressing sleeve, where a pumping cavity is formed within the pump case; the piston is arranged within the pumping cavity and connected to the piston on an inner wall of the pumping cavity; a first end of the pump rod is connected to the piston; the pressing sleeve is sleeved on an outer circumference of a second end of the pump rod; a gap is formed between the pressing sleeve and the pump rod; and an inner circumference of the pressing sleeve and an outer circumference of the pump rod are clamped with each other to realize two-way motion limitation in a length direction of the pump rod. The pressing pump can maintain stable and smooth operation of the piston in the pressing process of the pressing pump.

12 Claims, 5 Drawing Sheets

(56) References Cited

FOREIGN PATENT DOCUMENTS

| | | | |
|---|---|---|---|
| JP | 2005238197 | A | 9/2005 |
| JP | 2007534571 | A | 11/2007 |
| JP | 2008260539 | A | 10/2008 |
| JP | 2010274964 | A | 12/2010 |
| JP | 2014532013 | A | 12/2014 |
| JP | 2017213496 | A | 12/2017 |
| KR | 200475205 | Y1 | 11/2014 |
| KR | 200475969 | Y1 | 1/2015 |
| KR | 20160147247 | A | 12/2016 |
| WO | 2017022996 | A1 | 2/2017 |

* cited by examiner

PRESSING PUMP

CROSS REFERENCE TO THE RELATED APPLICATIONS

This application is based upon and claims priority to Chinese Patent Application No. 202310675428.5, filed on Jun. 8, 2023, the entire contents of which are incorporated herein by reference.

TECHNICAL FIELD

The present disclosure relates to the technical field of pumps, and more particularly to a pressing pump.

BACKGROUND

A pressing pump, as a core component of a pressing type package bottle such as a lotion bottle, is integrally mounted at the position of a bottle cap of the package bottle to realize dispensing of a paste or liquid material such as a lotion, thereby greatly improving the convenience of use by a user.

Chinese invention patent No. CN210455794U discloses a novel lotion bottle pump core. The technical key points are as follows: the novel lotion bottle pump core includes a pressing sleeve, a connecting rod, a connector, and a pump body. The connecting rod is inserted into the pressing sleeve and is in rotary locking connection with the pressing sleeve; a piston is sleeved on the lower end of the connecting rod; a water sealing cavity is formed at the lower end of the pump; a water sealing sheet is mounted in the water sealing cavity; a liquid suction opening is formed below the water sealing cavity; the connector is pressed and inserted into the pump body; the pressing sleeve is inserted into the connector; a spring is sleeved on the pressing sleeve; and the spring is arranged between the pressing sleeve and the connector.

The piston is a key component of the whole pump core structure. Sealed piston motion between the piston and the inner wall of the pump body allows for extraction and pumping of a liquid material. The sealed state between the piston and the pump body is key for the whole pump body to work normally.

In an existing pressing pump, the pressing sleeve and the connecting rod are fixed to each other and sleeved and fixed with each other through interference fit. In use, the connecting rod is driven by the pressing sleeve to move, thereby driving the piston to realize piston pumping actions.

However, if a pressure acting on the pressing sleeve is oblique at a certain angle, the oblique pressing sleeve will drive the connecting rod to synchronously incline and deflect. The deflecting connecting rod then drives the piston to float and deflect accordingly, which may easily cause certain floating and deflection between the piston and the inner wall of the pump body. Consequently, the sealed state between the piston and the inner wall of the pump body during movement of the piston may be affected.

To avoid potential leakage between the piston and the inner wall of the pump body, the accuracy of the fit of the piston with other components needs to be improved, and the influence of deflection of the pressing sleeve and the connecting rod from the piston may be reduced with higher accuracy. However, to improve the accuracy of the fit of components, the production cost of the pressing pump will be greatly increased, and the above-mentioned problem cannot be effectively solved.

Therefore, there is a need to propose a new solution to solve the problem.

SUMMARY

An objective of the present disclosure is to solve the above problem and provide a pressing pump so that stable and smooth operation of a piston can be maintained in the pressing process of the pressing pump.

The technical objective of the present disclosure is achieved by the following technical solution: a pressing pump includes the following steps: a pump case, a piston, a pump rod, and a pressing sleeve, where a pumping cavity is formed within the pump case; the piston is arranged within the pumping cavity and connected to the piston on an inner wall of the pumping cavity; a first end of the pump rod is connected to the piston; the pressing sleeve is sleeved on an outer circumference of a second end of the pump rod; a gap allowing relative movement is formed between an inner circumference of the pressing sleeve and an outer circumference of the pump rod; and the pressing sleeve and the pump rod are clamped with each other to realize two-way linkage in a length direction of the pump rod.

Further, a limiting protrusion is arranged on the inner circumference of the pressing sleeve and a limiting groove is formed in the outer circumference of the pump rod; and the limiting protrusion is clamped within the limiting groove and has a moving space in the length direction of the pump rod.

Further, the limiting groove is of an annular structure; and the limiting protrusion is of an annular structure matching the limiting groove.

Further, the limiting protrusion has a first limiting surface facing the piston and a second limiting surface facing away from the piston; the limiting groove has a third limiting surface facing away from the piston and a fourth limiting surface facing the piston; the third limiting surface is opposite to the first limiting surface; and the fourth limiting surface is opposite to the second limiting surface.

Further, the limiting protrusion has a first limiting surface facing the piston, and the first limiting surface is flared gradually toward the piston; the limiting groove has a third limiting surface opposite to the first limiting surface; and the third limiting surface is flared gradually toward the piston and matches the first limiting surface.

Further, the first end of the pump rod is formed into an opening reduction portion which narrows gradually toward the piston.

Further, a plurality of nicks are formed in the limiting protrusion, and a plurality of lugs distributed annularly and discontinuously are formed on the limiting protrusion.

Further, a notch is formed at the first end of the pump rod, and the notch extends toward the second end to the limiting groove.

Further, the limiting groove has a bottom surface facing the inner circumference, and the limiting protrusion has a top surface facing the outer circumference; and the top surface is oriented opposite to the bottom surface, and the gap is formed between the top surface and the bottom surface.

Further, the pressing pump further includes a spring, a one-way valve, and a mounting sleeve, where the spring elastically acts on the pressing sleeve in a direction away from the piston; a liquid inlet is formed in the pump case; the one-way valve is arranged at the liquid inlet and configured for unidirectional communication toward the pumping cavity; a mounting opening is formed in the pump case; the mounting sleeve is of an annular structure and mounted at the mounting opening to press against and limit the piston; and the pressing sleeve extends out of the pump case from an inner circumference of the mounting sleeve.

Further, the piston is of an annular structure, and an outer circumference of the piston is connected to the piston on the inner wall of the pumping cavity, while an inner circumference of the piston is sleeved on the outer circumference of the pump rod; the piston is slidably adjustable in the length direction of the pump rod and has a slide stroke relative to the pump rod; an end portion of the second end of the pump rod is fixedly connected to a limiting seat; a tapered lug boss is formed between the limiting seat and the pump rod; the slide stroke of the piston is limited by the limiting seat and the pressing sleeve; a valve hole is formed in the pump rod, and the valve hole is open toward the second end; a through hole communicated with the valve hole is formed in the outer circumference of the second end of the pump rod at a position adjacent to the limiting seat; and during the slide stroke, the piston presses against the limiting seat to close the through hole and presses against the pressing sleeve to open the through hole.

To sum up, the present disclosure has the following beneficial effects:

By using a movable leakage structure between the pressing sleeve and the pump rod, the influence of oblique deflection directly transferred to the piston on the pressing sleeve is reduced; deflection and floating generated by the piston are reduced; and it is ensured that the piston can work stably and normally. The gap allowing relative movement is formed between the pressing sleeve and the pump rod. An oblique deflecting pressing force acting on the pressing sleeve is absorbed by the pressing sleeve by independent deflection. The oblique deflection of the pump rod is reduced, and the influence of the oblique deflection of the pump rod on the piston is reduced accordingly. An acting force on the pressing sleeve in a press-down direction can still be transferred by two components pressing against each other, ensuring stable and smooth operation of the pump rod and the piston.

LIST OF REFERENCE NUMERALS

1—pump case; 11—liquid inlet; 12—mounting opening; 13—pumping cavity; 2—piston; 3—pump rod; 301—first end; 302—second end; 31—limiting seat; 32—tapered lug boss; 33—valve hole; 34—through hole; 35—limiting groove; 351—third limiting surface; 352—fourth limiting surface; 353—bottom surface; 36—notch; 37—opening reduction portion; 4—pressing sleeve; 41—limiting protrusion; 411—first limiting surface; 412—second limiting surface; 413—top surface; 42—nick; 5—mounting sleeve; 6—one-way valve; 61—one-way plug; 62—supporting ring; 63—connecting piece; 7—gap; and 8—moving space.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Figure 1:
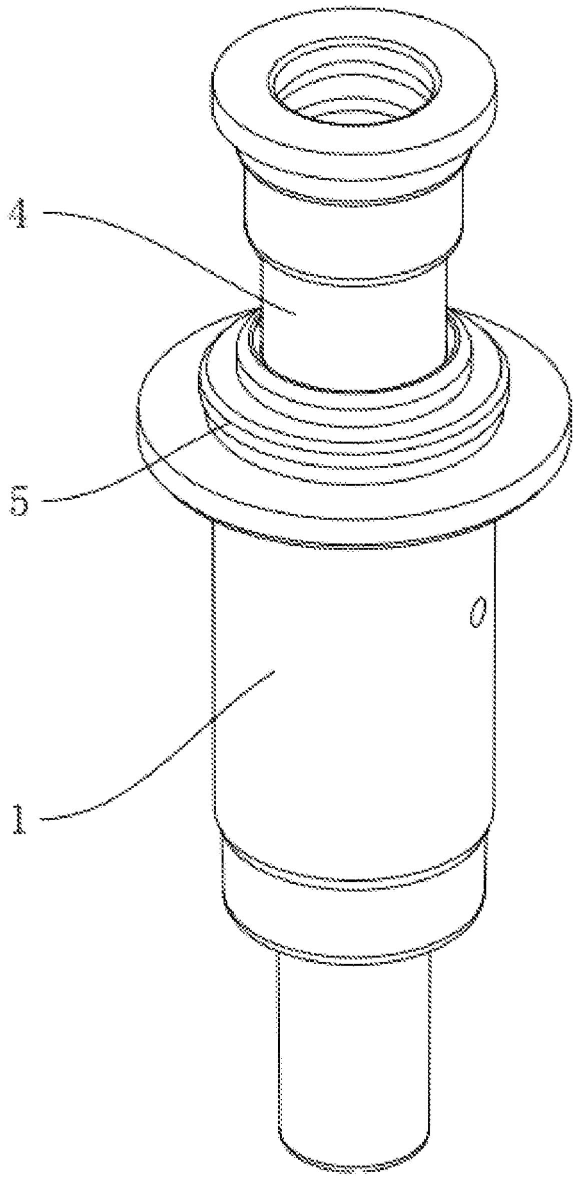
FIG. 1 is a stereoscopic diagram of a pressing pump according to the present disclosure.
Figure 2:
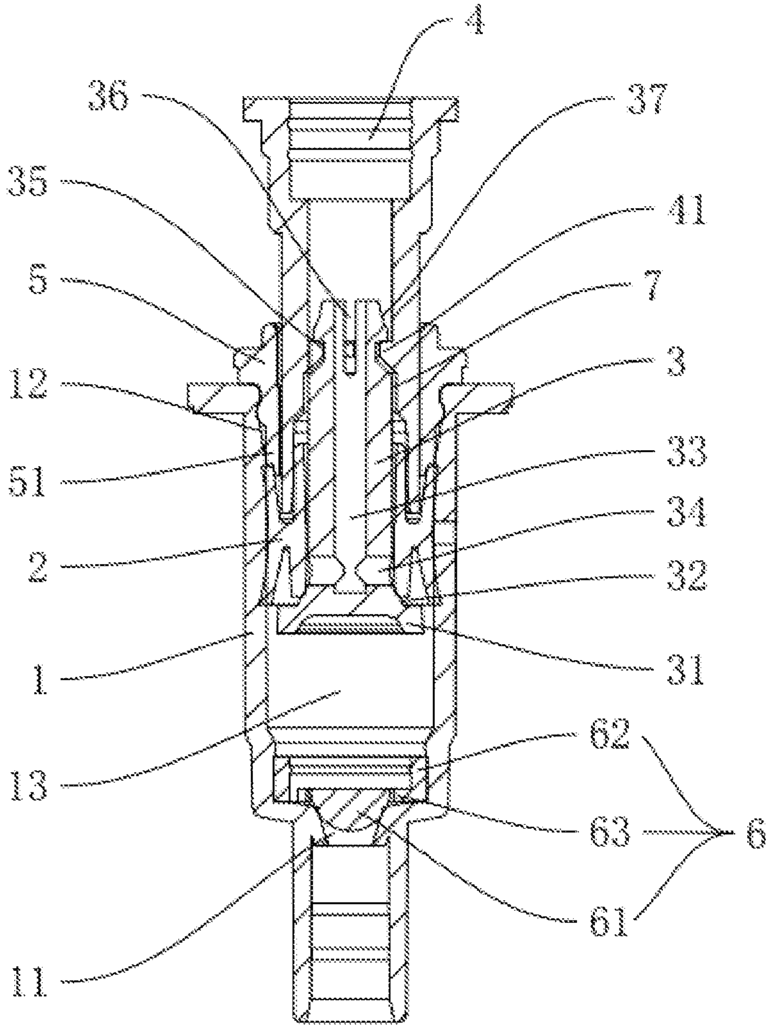
FIG. 2 is a cross-sectional diagram of a pressing pump according to the present disclosure.
Figure 3:
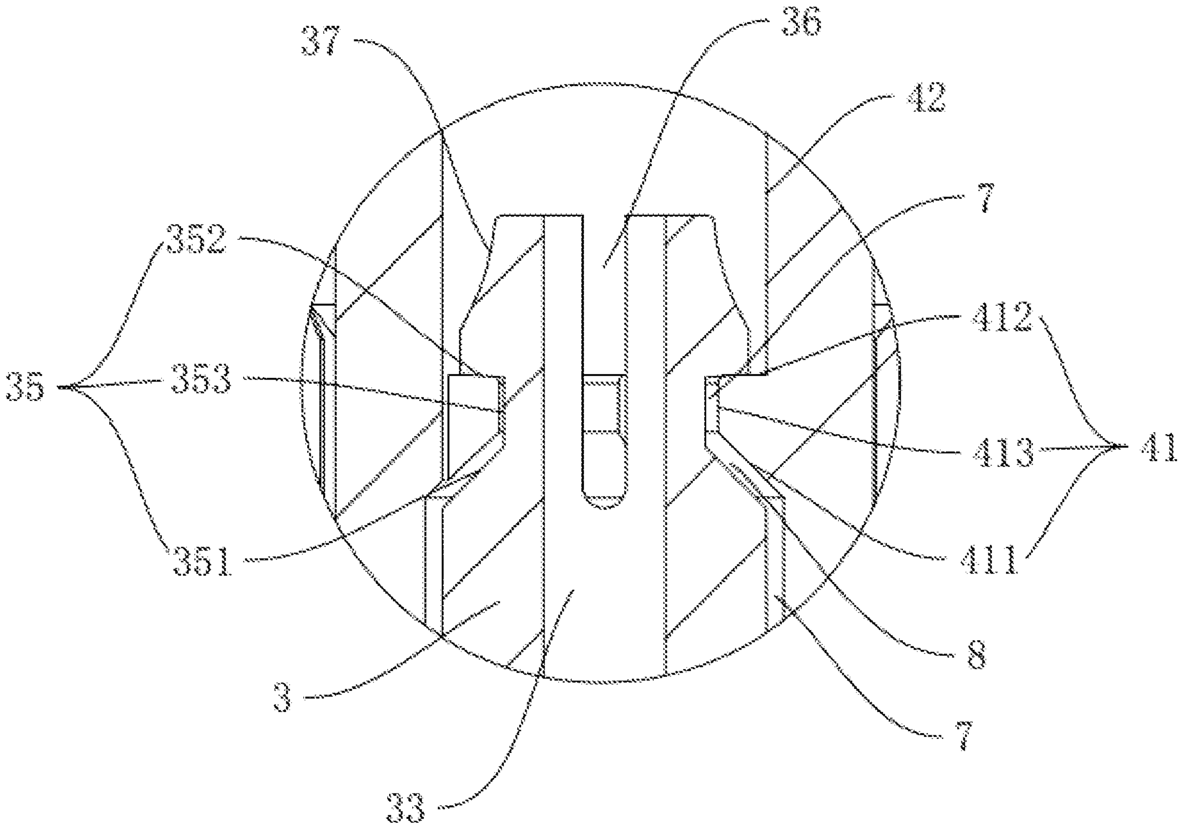
FIG. 3 is a schematic diagram of a connection structure of a pressing sleeve and a pump rod according to the present disclosure.
Figure 4:
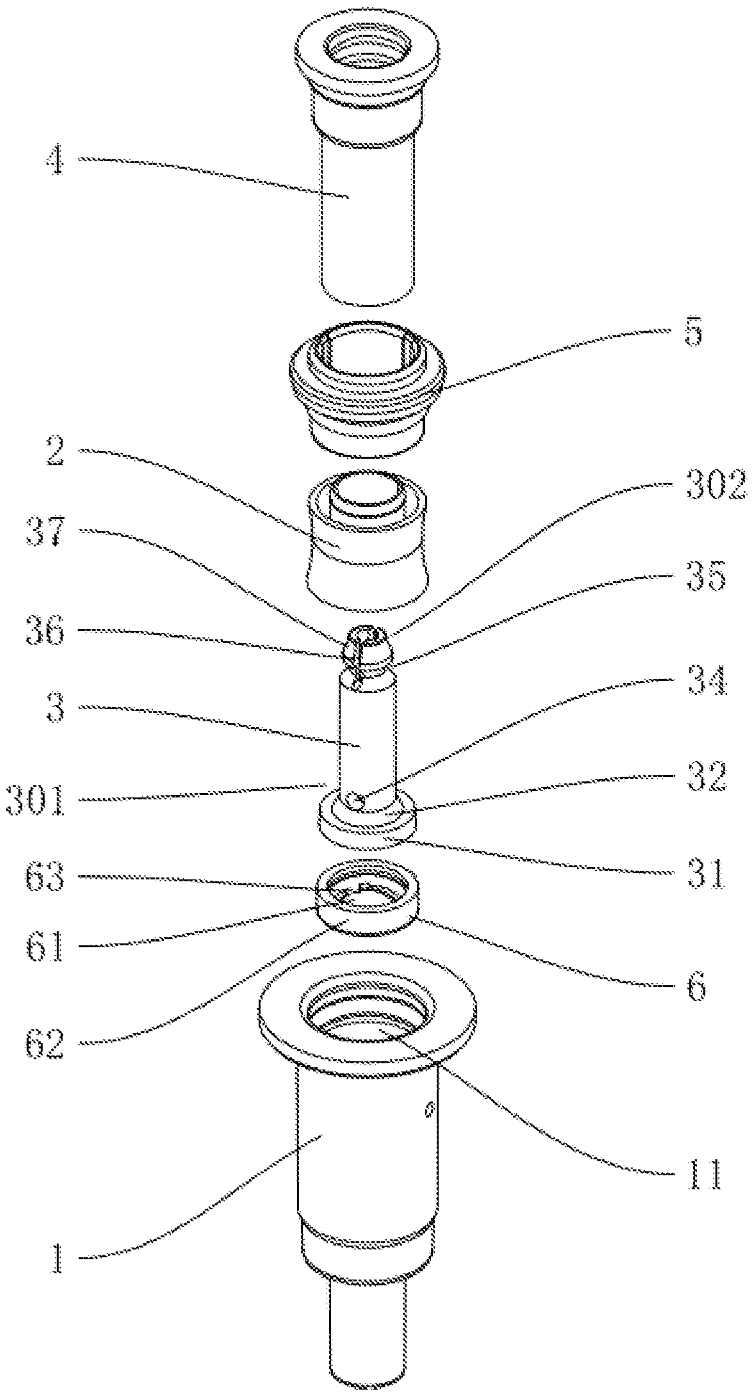
FIG. 4 is an exploded diagram of a pressing pump according to the present disclosure.
Figure 5:
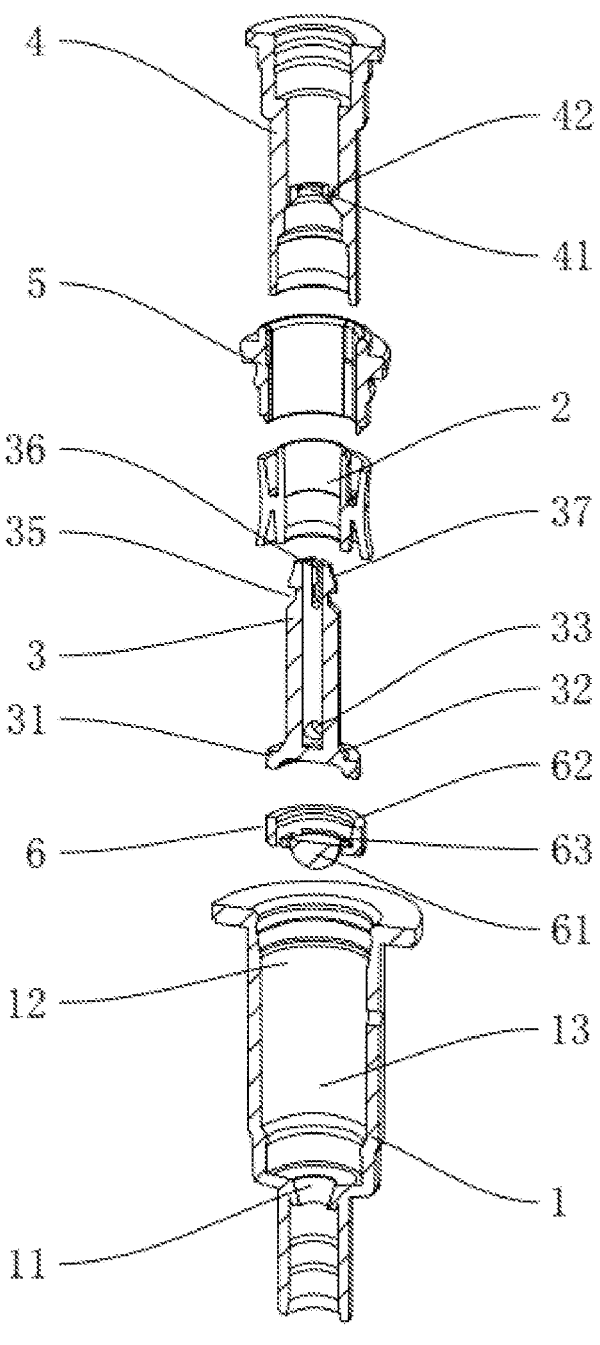
FIG. 5 is an exploded cross-sectional diagram of a pressing pump according to the present disclosure.

The present embodiment discloses a pressing pump, as shown in FIG. 1 to FIG. 5, including pump case 1, piston 2, pump rod 3, pressing sleeve 4, a spring, one-way valve 6, and mounting sleeve 5. These components are combined with one another to form the pressing pump, and a liquid material can be pumped by pressing.

The pump case 1 is of a tubular structure, in which hollow pumping cavity 13 is formed. The pumping cavity 13 is of the tubular structure. The piston 2 and the pumping cavity 13 match each other. The piston 2 is mounted within the pumping cavity 13 and form a connection structure of the piston 2 with the inner wall of the pumping cavity 13.

Liquid inlet 11 is formed at one end of the pump case 1, and mounting opening 12 is formed at the other end of the pump case 1. The liquid inlet 11 is capable of allowing a liquid material to enter the pumping cavity 13. Other component may be mounted at the mounting opening 12. One-way valve 6 is mounted at the liquid inlet 11. The one-way valve 6 includes supporting ring 62, one-way plug 61, and connecting piece 63. The one-way plug 61 is connected to an inner circumference of the supporting ring 62 through the connecting piece 63, and float regulating of the one-way valve 6 can be realized.

The supporting ring 62 is embedded and fixed at a position on an inner side of the liquid inlet 11. The one-way plug 61 is of a hemispheric structure. The one-way plug 61 presses against the inner side of the liquid inlet 11 and presses against the liquid inlet 11 to realize sealing. In the process of a liquid material entering the pumping cavity 13 through the liquid inlet 11, the liquid material pushes away the one-way plug 61, and one-way liquid feed can be realized at the liquid inlet 11. In the process of a pressure acting on the pumping cavity 13, the liquid material presses the one-way plug 61 against the liquid inlet 11, and one-way closure at the liquid inlet 11 is realized.

The mounting sleeve 5 is of an annular structure and mounted at the mounting opening 12. A portion of the mounting sleeve 5 extends into the mounting opening 12 to achieve mounting, and the mounting sleeve 5 can be clamped and fixed with the mounting opening 12. With the mounting sleeve 5, the motion of the piston 2 may be limited, and the piston 2 may be stably limited within the pumping cavity 13. An outer circumferential size of the pressing sleeve 4 matches an inner circumferential size of the mounting sleeve 5 so that the pressing sleeve 4 can be pressed and regulated smoothly.

A length direction of the pump rod 3 is arranged in a moving direction of the piston 2. The piston 2 may be interconnected with the pressing sleeve 4 by the pump rod 3 such that the pressing sleeve 4 is capable of driving the piston 2 to move. First end 301 of the pump rod 3 extends into the piston 2 and is connected to the piston 2. Second end 302 of the pump rod 3 extends toward the pressing sleeve 4 and is interconnected with the pressing sleeve 4.

The piston 2 is of an annular structure, and an outer circumference of the piston 2 is connected to the piston 2 on the inner wall of the pumping cavity 13 and an inner circumference of the piston 2 is sleeved on an outer circumference of the pump rod 3. The piston 2 is slidably adjustable in the length direction of the pump rod 3 and has a slide stroke relative to the pump rod 3. In the sliding process of the piston 2 relative to the pump case 1, pumping of the piston 2 is realized.

Limiting seat 31 protruding outwards is formed at an end portion position of the second end 302 of the pump rod 3. The limiting seat 31 is of an annular structure and may limit the motion of the piston 2. Tapered lug boss 32 is formed between the limiting seat 31 and the pump rod 3. In the process of the piston 2 moving toward the limiting seat 31, an end face of the piston 2 and the tapered lug boss 32 may press against each other, thereby realizing sealing between the piston 2 and the pump rod 3.

The slide stroke of the piston 2 relative to the pump rod 3 is limited by the limiting seat 31 and the pressing sleeve 4. The piston 2 has an upper end which is stopped and limited by a lower side of the pressing sleeve 4 and a lower end which is stopped and limited by the limiting seat 31 and the tapered lug boss 32. Valve hole 33 is formed in the pump rod 3, and the valve hole 33 is open toward the second end 302. Through hole 34 is formed in the outer circumference of the second end 302 of the pump rod at a position adjacent to the limiting seat 31. The through hole 34 is communicated with the valve hole 33 such that the valve hole 33 is communicated with the outer circumference of the pump rod 3.

In the slide stroke of the piston 2, the piston 2 moves downwards relative to the pump rod 3 and then presses against the limiting seat 31. The piston 2 will press against the tapered lug boss 32, thereby realizing sealing between the piston 2 and the pump rod 3, and the through hole 34 can be closed. After the piston 2 moves upwards relative to the pump rod 3, the piston 2 will press against the pressing sleeve 4. The piston 2 will be separated from the tapered lug boss to open the through hole 34, and then the liquid material can be output through the pump rod 3.

The spring is sleeved on the outer circumference position (not shown in the figure) of the pressing sleeve 4. Two ends of the spring press against stepped surfaces of the pressing sleeve 4 and the mounting sleeve 5, respectively. The spring may elastically act on the pressing sleeve 4 in a direction away from the piston 2 so that the pressing sleeve 4 can reset automatically and elastically after being pressed. Moreover, after the pressing sleeve 4 resets, the piston 2 is limited by the mounting sleeve 5 so that the piston 2 can close the through hole 34 in the outer circumference of the first end 301 of the pump rod 3.

A movable connection structure is formed between the pressing sleeve 4 and the pump rod 3. The pressing sleeve 4 is sleeved on the outer circumference of the second end 302 of the pump rod 3. Gap 7 is formed between the inner circumference of the pressing sleeve 4 and the outer circumference of the pump rod 3 so that mutually oblique deflection of movement positions can be caused between the pressing sleeve 4 and the pump rod 3. In the process of the pressing sleeve 4 pressing the pump rod 3, the pump rod 3 is axially supported by the piston 2, and a stable connection state is maintained between the piston 2 and the pumping cavity 13. That is, when oblique deflection is caused in the pressing process of the pressing sleeve 4, the pressing sleeve 4 is capable of driving the pump rod 3 to press down, and subsequently in the rising process of the pressing sleeve 4, the pump rod 3 can be driven to reset. Thus, two-way linkage of the pressing sleeve 4 and the pump rod 3 in the pressing and rising processes can be maintained.

The inner circumference of the pressing sleeve 4 and the outer circumference of the pump rod 3 are clamped with each other so that the force transmission can be formed between the pressing sleeve 4 and the pump rod 3, realizing two-way motion limitation in the length direction of the pump rod 3.

As shown in FIG. 2 to FIG. 5, limiting protrusion 41 is arranged on the inner circumference of the pressing sleeve 4, and limiting groove 35 is formed in the outer circumference of the pump rod 3. The limiting protrusion 41 and the limiting groove 35 match each other so that the limiting protrusion 41 can be clamped into the limiting groove 35, forming a mutually clamped structure between the pump rod 3 and the pressing sleeve 4. The limiting protrusion 41 is smaller than the limiting groove 35 such that moving space 8 is formed between the limiting protrusion 41 and the limiting groove 35, and therefore, the moving space 8 in the length direction of the pump rod 3 can be formed between the pressing sleeve 4 and the pump rod 3. In the process of being pressed, the pressing sleeve 4 generates adaptive oblique deflection. The pressing sleeve 4 may not drive the pump rod 3 to obliquely deflect, and the pump rod 3 can still stably move by following the piston 2 and may also not cause the piston 2 to obliquely deflect. Smooth and stable motion of the piston 2 can be maintained.

The limiting groove 35 is of an annular structure. The limiting protrusion 41 is of an annular structure matching the limiting groove 35. Thus, an annular clamped structure is formed between the pressing sleeve 4 and the pump rod 3, and the connection state between the pressing sleeve 4 and the pump rod 3 can be stably maintained.

The limiting protrusion 41 has first limiting surface 411 facing the piston 2 and second limiting surface 412 facing away from the piston 2. Moreover, the limiting groove 35 has third limiting surface 351 and fourth limiting surface 352. The third limiting surface 351 is oriented opposite to the first limiting surface 411, and the two limiting surfaces may press against each other to transfer a pressure toward the piston 2. The fourth limiting surface 352 is oriented opposite to the second limiting surface 412, and the two limiting surfaces may press against each other to transfer a pressure facing away from the piston 2. By pressing transmission between the limiting surfaces, linkage between the pressing sleeve 4 and the pump rod 3 can be realized.

In addition, the limiting groove 35 further has bottom surface 353 toward the inner circumference, and the bottom surface 353 is of an annular structure. The limiting protrusion 41 has top surface 413 toward the outer circumference, and the top surface 413 is also of an annular structure. The top surface 413 is oriented opposite to the bottom surface 353, and the gap 7 is formed between the top surface and the bottom surface. With the gap 7, adaptive oblique deflection can be generated between the limiting protrusion 41 and the limiting groove 35, and a movably linked structure can be maintained between the pressing sleeve 4 and the pump rod 3.

Further, the first limiting surface 411 at the limiting protrusion 41 is flared gradually toward the piston 2. The third limiting surface 351 at the limiting groove 35 is flared gradually toward the piston 2. The first limiting surface 411 and the third limiting surface 351 match each other to form a mutually sleeved tapered structure. In the one hand, in the press-down process of the pressing sleeve 4, the tapered structure causes a certain centering action between the first limiting surface 411 and the second limiting surface 412, thereby improving the stability of the pressing sleeve 4 in the pressing process. On the other hand, the flared first limiting surface 411 is capable of forming a guiding structure, and the pump rod 3 can play a role in guiding in the process of being pressed into the pressing sleeve 4, thereby improving the smoothness of clamping of the two.

Further, the first end 301 of the pump rod 3 is formed into opening reduction portion 37 which narrows gradually toward the piston 2. The opening reduction portion 37 can also play a role as an obliquely guiding structure. Since the opening reduction portion 37 of the tapered structure and the first limiting surface 411 match each other, the smoothness of clamping of the pressing sleeve 4 and a pump body can be further improved.

Further, a plurality of nicks 42 are formed in the limiting protrusion 41. The limiting protrusion 41 can be divided by the nicks 42, and a plurality of lugs distributed annularly and discontinuously are formed on the limiting protrusion 41. The lug is of a circular-arc-shaped structure. Independent lugs may have a flexible deformation amplitude as compared with an entire annular limiting convex ring, thereby improving the smoothness of mutual clamping of the limiting protrusion 41 and the limiting groove 35 and facilitating mutual assembling of the pressing sleeve 4 with the pump rod 3.

Further, notch 36 may be formed at the position of the first end 301 of the pump rod 3. The notch 36 extends from the end face of the second end 302 toward the second end 302 of the pump rod 3 to the position of the limiting groove 35. The position of the second end 302 of the pump rod 3 can be divided into two portions by the notch 36, and a space allowing deformation is formed at the position of the notch 36 so that the pump rod 3 can be smoothly clamped into the pressing sleeve 4.

The foregoing are merely descriptions of the preferred embodiments of the present disclosure. The protection scope of the present disclosure is not limited to the foregoing embodiments, and all technical solutions belonging to the idea of the present disclosure fall within the protection scope of the present disclosure. It should be noted that several improvements and modifications may be made by those of ordinary skill in the art without departing from the principle of the present disclosure, and these improvements and modifications should fall within the protection scope of the present disclosure.

What is claimed is:

1. A pressing pump, comprising a pump case, a piston, a pump rod, and a pressing sleeve, wherein a pumping cavity is formed within the pump case; the piston is arranged within the pumping cavity; a first end of the pump rod is connected to the piston; the pressing sleeve is sleeved on a second end of the pump rod; a gap allowing relative movement is formed between an inner circumference of the pressing sleeve and an outer circumference of the pump rod; and the pressing sleeve and the pump rod are clamped with each other to realize two-way linkage in a length direction of the pump rod;

a limiting protrusion is arranged on the inner circumference of the pressing sleeve, and a limiting groove is formed in the outer circumference of the pump rod; and the limiting protrusion is clamped within the limiting groove and has a moving space in the length direction of the pump rod;

the limiting groove is of a first annular structure and the limiting protrusion is of a second annular structure matching the limiting groove; and a plurality of nicks are formed in the limiting protrusion, and a plurality of lugs distributed annularly and discontinuously are formed on the limiting protrusion.

2. The pressing pump according to claim 1, wherein the limiting protrusion has a first limiting surface and a second limiting surface, wherein the second limiting surface faces away from the piston; the limiting groove has a third limiting surface and a fourth limiting surface, wherein the fourth limiting surface faces the piston; the third limiting surface is opposite to the first limiting surface; and the fourth limiting surface is opposite to the second limiting surface.

3. The pressing pump according to claim 1, wherein the limiting protrusion has a first limiting surface, and the first limiting surface is flared toward the piston; the limiting groove has a third limiting surface opposite to the first limiting surface; and the third limiting surface is flared toward the piston and matches the first limiting surface.

4. The pressing pump according to claim 1, wherein the first end of the pump rod is formed into an opening reduction portion, wherein the opening reduction portion narrows facing away from the piston.

5. The pressing pump according to claim 1, wherein a notch is formed at the first end of the pump rod, and the notch extends toward the second end of the pump rod to the limiting groove.

6. The pressing pump according to claim 1, wherein the limiting groove has a bottom surface, and the limiting protrusion has a top surface; and the top surface is oriented opposite to the bottom surface, and the gap is formed between the top surface and the bottom surface.

7. The pressing pump according to claim 1, further comprising a spring, a one-way valve, and a mounting sleeve, wherein the spring elastically acts on the pressing sleeve in a direction away from the piston; a liquid inlet is formed in the pump case; the one-way valve is arranged at the liquid inlet and configured for unidirectional communication toward the pumping cavity; a mounting opening is formed in the pump case; the mounting sleeve is of a third annular structure and mounted at the mounting opening to press against and limit the piston; and the pressing sleeve extends out of the pump case from an inner circumference of the mounting sleeve; and the piston is of a fourth annular structure, and an inner circumference of the piston is sleeved on the outer circumference of the pump rod; the piston is slidably adjustable in the length direction of the pump rod and has a slide stroke relative to the pump rod; an end portion of the second end of the pump rod is fixedly connected to a limiting seat; a tapered lug boss is formed between the limiting seat and the pump rod; the slide stroke of the piston is limited by the limiting seat and the pressing sleeve; a valve hole is formed in the pump rod, and the valve hole is open toward the second end of the pump rod; a through hole communicated with the valve hole is formed in the second end of the pump rod at a position adjacent to the limiting seat; and during the slide stroke, the piston presses against the limiting seat to close the through hole and presses against the pressing sleeve to open the through hole.

8. The pressing pump according to claim 2, further comprising a spring, a one-way valve, and a mounting sleeve, wherein the spring elastically acts on the pressing sleeve in a direction away from the piston; a liquid inlet is formed in the pump case; the one-way valve is arranged at the liquid inlet and configured for unidirectional communication toward the pumping cavity; a mounting opening is formed in the pump case; the mounting sleeve is of a third annular structure and mounted at the mounting opening to press against and limit the piston; and the pressing sleeve extends out of the pump case from an inner circumference of the mounting sleeve; and the piston is of a fourth annular structure, and an inner circumference of the piston is sleeved on the outer circumference of the pump rod; the piston is slidably adjustable in the length direction of the pump rod and has a slide stroke relative to the pump rod; an end portion of the second end of the pump rod is fixedly connected to a limiting seat; a tapered lug boss is formed between the limiting seat and the pump rod; the slide stroke of the piston is limited by the limiting seat and the pressing sleeve; a valve hole is formed in the pump rod, and the valve hole is open toward the second end of the pump rod; a through hole communicated with the valve hole is formed in the second end of the pump rod at a position adjacent to the limiting seat; and during the slide stroke, the piston presses against the limiting seat to close the through hole and presses against the pressing sleeve to open the through hole.

9. The pressing pump according to claim 3, further comprising a spring, a one-way valve, and a mounting sleeve, wherein the spring elastically acts on the pressing sleeve in a direction away from the piston; a liquid inlet is formed in the pump case; the one-way valve is arranged at the liquid inlet and configured for unidirectional communication toward the pumping cavity; a mounting opening is formed in the pump case; the mounting sleeve is of a third annular structure and mounted at the mounting opening to press against and limit the piston; and the pressing sleeve extends out of the pump case from an inner circumference of the mounting sleeve; and the piston is of a fourth annular structure, and an inner circumference of the piston is sleeved on the outer circumference of the pump rod; the piston is slidably adjustable in the length direction of the pump rod and has a slide stroke relative to the pump rod; an end portion of the second end of the pump rod is fixedly connected to a limiting seat; a tapered lug boss is formed between the limiting seat and the pump rod; the slide stroke of the piston is limited by the limiting seat and the pressing sleeve; a valve hole is formed in the pump rod, and the valve hole is open toward the second end of the pump rod; a through hole communicated with the valve hole is formed in the second end of the pump rod at a position adjacent to the limiting seat; and during the slide stroke, the piston presses against the limiting seat to close the through hole and presses against the pressing sleeve to open the through hole.

10. The pressing pump according to claim 4, further comprising a spring, a one-way valve, and a mounting sleeve, wherein the spring elastically acts on the pressing sleeve in a direction away from the piston; a liquid inlet is formed in the pump case; the one-way valve is arranged at the liquid inlet and configured for unidirectional communication toward the pumping cavity; a mounting opening is formed in the pump case; the mounting sleeve is of a third annular structure and mounted at the mounting opening to press against and limit the piston; and the pressing sleeve extends out of the pump case from an inner circumference of the mounting sleeve; and the piston is of a fourth annular structure, and an inner circumference of the piston is sleeved on the outer circumference of the pump rod; the piston is slidably adjustable in the length direction of the pump rod and has a slide stroke relative to the pump rod; an end portion of the second end of the pump rod is fixedly connected to a limiting seat; a tapered lug boss is formed between the limiting seat and the pump rod; the slide stroke of the piston is limited by the limiting seat and the pressing sleeve; a valve hole is formed in the pump rod, and the valve hole is open toward the second end of the pump rod; a through hole communicated with the valve hole is formed in the second end of the pump rod at a position adjacent to the limiting seat; and during the slide stroke, the piston presses against the limiting seat to close the through hole and presses against the pressing sleeve to open the through hole.

11. The pressing pump according to claim 5, further comprising a spring, a one-way valve, and a mounting sleeve, wherein the spring elastically acts on the pressing sleeve in a direction away from the piston; a liquid inlet is formed in the pump case; the one-way valve is arranged at the liquid inlet and configured for unidirectional communication toward the pumping cavity; a mounting opening is formed in the pump case; the mounting sleeve is of a third annular structure and mounted at the mounting opening to press against and limit the piston; and the pressing sleeve extends out of the pump case from an inner circumference of the mounting sleeve; and the piston is of a fourth annular structure, and an inner circumference of the piston is sleeved on the outer circumference of the pump rod; the piston is slidably adjustable in the length direction of the pump rod and has a slide stroke relative to the pump rod; an end portion of the second end of the pump rod is fixedly connected to a limiting seat; a tapered lug boss is formed between the limiting seat and the pump rod; the slide stroke of the piston is limited by the limiting seat and the pressing sleeve; a valve hole is formed in the pump rod, and the valve hole is open toward the second end of the pump rod; a through hole communicated with the valve hole is formed in the second end of the pump rod at a position adjacent to the limiting seat; and during the slide stroke, the piston presses against the limiting seat to close the through hole and presses against the pressing sleeve to open the through hole.

12. The pressing pump according to claim 6, further comprising a spring, a one-way valve, and a mounting sleeve, wherein the spring elastically acts on the pressing sleeve in a direction away from the piston; a liquid inlet is formed in the pump case; the one-way valve is arranged at the liquid inlet and configured for unidirectional communication toward the pumping cavity; a mounting opening is formed in the pump case; the mounting sleeve is of a third annular structure and mounted at the mounting opening to press against and limit the piston; and the pressing sleeve extends out of the pump case from an inner circumference of the mounting sleeve; and the piston is of a fourth annular structure, and an inner circumference of the piston is sleeved on the outer circumference of the pump rod; the piston is slidably adjustable in the length direction of the pump rod and has a slide stroke relative to the pump rod; an end portion of the second end of the pump rod is fixedly connected to a limiting seat; a tapered lug boss is formed between the limiting seat and the pump rod; the slide stroke of the piston is limited by the limiting seat and the pressing sleeve; a valve hole is formed in the pump rod, and the valve hole is open toward the second end of the pump rod; a through hole communicated with the valve hole is formed in the second end of the pump rod at a position adjacent to the limiting seat; and during the slide stroke, the piston presses against the limiting seat to close the through hole and presses against the pressing sleeve to open the through hole.

* * * * *